No. 632,380. Patented Sept. 5, 1899.
E. R. STILWELL.
TROLLEY WHEEL.
(Application filed Oct. 24, 1898.)
(No Model.)

Witnesses
W. J. Hines.
Carl H. Moe.

E. R. Stilwell.
Inventor.
By R. J. McCarty
his Attorney

UNITED STATES PATENT OFFICE.

EDWIN R. STILWELL, OF DAYTON, OHIO.

TROLLEY-WHEEL.

SPECIFICATION forming part of Letters Patent No. 632,380, dated September 5, 1899.

Application filed October 24, 1898. Serial No. 694,421. (No model.)

*To all whom it may concern:*

Be it known that I, EDWIN R. STILWELL, a citizen of the United States, residing at Dayton, in the county of Montgomery and State of Ohio, have invented certain new and useful Improvements in Trolley-Wheels; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

This invention relates to improvements in trolley-wheels for electrical railways.

The object of the said invention is to provide a trolley-wheel the usefulness and life of which are greatly prolonged by reason of the structural features hereinafter described and claimed. In carrying out this object I provide a bushing for said wheel with a spacious lubricating-chamber therein. The necessity of having such chamber of suitable area to insure a thorough lubricating of the spindle throughout its length and at the same time not weakening the said bushing as a support for the wheel is fully borne in mind in the construction of the wheel. The chamber is provided with a series of specially-arranged ports to conduct the lubricating substance therefrom to the spindle in such quantities, at such points, and at such times during the rotations of the wheel as to insure a proper lubrication of the wheel-spindle.

As a preliminary to a detailed description of my improved trolley-wheel reference is made to the accompanying drawings, of which—

Figure 1:
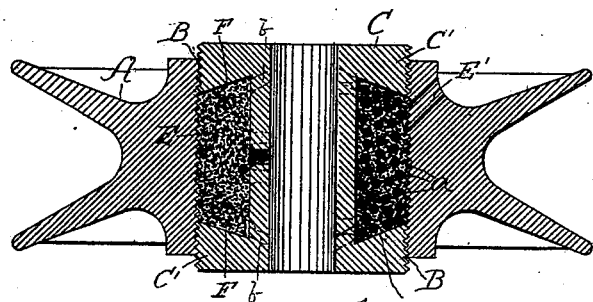
Figure 3:
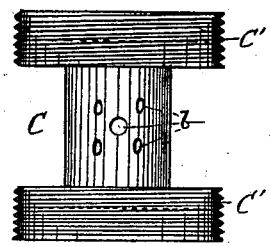
Figure 4:
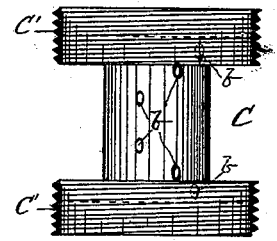
Figure 2:
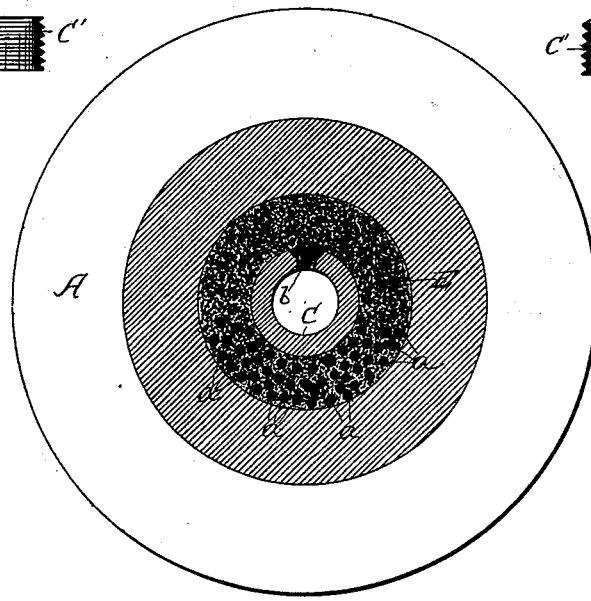
Figure 5:
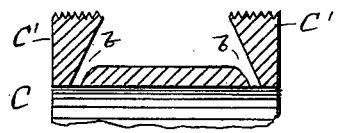

Figure 1 is a transverse sectional view of a trolley-wheel made in accordance with my invention. Fig. 2 is a sectional view taken centrally through the wheel on the plane of its groove. Figs. 3 and 4 are views of the bushing detached, showing the arrangement of the ports. Fig. 5 is a sectional view of a portion of the bushing, showing the funnel shape of the ports.

In a detailed description similar reference-letters indicate the same parts in the several views of the drawings.

A designates the trolley-wheel, which is constructed of the most suitable metal to meet the requirements of such wheel. The construction is amply shown in Fig. 1 of the drawings, where the said wheel is shown to be of solid metal from its periphery to the screw-threaded wall B, in which the bushing C is placed. The bore or opening for said bushing is of a substantially large diameter in order to enable the placing therein of a bushing having the diameter and other structural features presently described.

The drawings represent a full-sized wheel with an opening for a bushing one and five-eighth inches in diameter; but of course the size of the wheel might be varied and also the bushing without departing from the spirit of my invention. However, as a wheel made in accordance with the above dimensions is known to have been in continuous service on a car for a number of trips aggregating thirteen thousand five hundred miles without replenishing the lubricant or giving the wheel any other attention it is thought that the construction shown gives the best results and should not be materially varied from.

The bushing C has screw-threaded ends C' C' for screwing it into the wheel. The portion of said bushing between the said screw-threaded ends is reduced in diameter to something less than one-half the diameter of the screw-threaded ends C' C' in order to provide a suitable chamber for holding a desirable quantity of lubricant or graphite E, which is fed thereto through a port E'. As hereinbefore stated, the chamber is constructed with a view to the introduction of suitable quantities of lubricant to the spindle throughout the approximate length of said spindle. The transverse area of said chamber is obtained by reducing the diameter of the bushing, as just stated, while the necessary longitudinal area of said chamber is obtained by cutting the end walls F F on an outward taper. This brings the inner terminals of said walls nearer the ends of the bushing and at the same time enables the ends of said bushing to have a proper engagement with the wheel on each side of the chamber. Mingled with the graphite within said chamber is a series of balls or agitators *a*, that serve to agitate the graphite and cause it to pass through the lubricating-ports *b* in the bushing whenever the wheel stops or is slackened in speed sufficiently to avoid the effect of centrifugal force upon the lubricant and agitators. The ports *b* are arranged from the center of the bushing outwardly toward the ends in diagonal lines, substantially as is shown in Figs. 3 and 4, so that the spindle is lubricated at some point of its length when the position of the wheel is favorable to said lubrication. Those ports that are nearest to the ends of the chamber are deflected outward in their positions in order to deposite the graphite at the farthest points on the spindle. In Figs. 1 and 4 of the drawings the extreme end ports are shown in broken lines beneath the over projecting walls F F.

Having fully described my invention, I claim—

1. In a trolley-wheel, the combination with a wheel the bore of which is of uniform diameter throughout its length, of a bushing having its ends screw-threaded to engage said wheel, the body of said bushing being reduced in diameter to provide a lubricating-chamber wholly within the bushing, the end walls of said chamber tapering outwardly to increase the inner longitudinal area of said chamber, and a series of orifices leading from said chamber, substantially as described.

2. In a trolley-wheel, the combination with a wheel the bore thereof being of uniform diameter throughout, of a bushing the ends of which are screw-threaded to engage with said wheel, and the body or intervening portion of which is reduced in diameter to provide a lubricating-chamber wholly within the bushing, the end walls of said chamber being deflected outwardly to increase the inner length thereof, and a series of lubricating-ports arranged in diagonal lines from the middle of said bushing, the ports adjacent to the end walls being approximately in the same incline plane with the said walls in order to discharge the lubricant approximately throughout the spindle, substantially as described.

In testimony that I claim the foregoing as my own I hereto affix my signature in presence of two witnesses.

EDWIN R. STILWELL.

Witnesses:
R. J. McCARTY,
W. J. HIMES.